United States Patent [19]

Cabasso et al.

[11] Patent Number: 4,602,922

[45] Date of Patent: Jul. 29, 1986

[54] METHOD OF MAKING MEMBRANES FOR GAS SEPARATION AND THE COMPOSITE MEMBRANES

[75] Inventors: Israel Cabasso, Syracuse, N.Y.; Kevin A. Lundy, Columbus, Ga.

[73] Assignee: Research Foundation of State University of New York, Albany, N.Y.

[21] Appl. No.: 709,005

[22] Filed: Mar. 7, 1985

Related U.S. Application Data

[63] Continuation-in-part of Ser. No. 670,519, Nov. 9, 1984, abandoned.

[51] Int. Cl.⁴ ............................................. B01D 53/22
[52] U.S. Cl. ..................................... 55/158; 427/245; 428/304.4; 428/327; 428/903
[58] Field of Search ................. 55/16, 158; 210/500.2; 427/245; 428/304–306, 326, 327

[56] References Cited

U.S. PATENT DOCUMENTS

| | | | |
|---|---|---|---|
| 3,874,986 | 4/1975 | Browall et al. | 161/160 |
| 3,980,456 | 9/1976 | Browall | 55/158 |
| 4,214,020 | 7/1980 | Ward et al. | 55/16 X |
| 4,230,463 | 10/1980 | Henis et al. | 55/16 |
| 4,393,113 | 7/1983 | Sugie et al. | 55/16 X |
| 4,406,673 | 9/1983 | Yamada et al. | 55/16 |
| 4,440,643 | 4/1984 | Makino et al. | 55/158 X |
| 4,444,662 | 4/1984 | Conover | 55/16 X |
| 4,493,714 | 1/1985 | Ueda et al. | 55/16 |

FOREIGN PATENT DOCUMENTS 105203  6/1980  Japan .

Primary Examiner—Robert Spitzer
Attorney, Agent, or Firm—Roger H. Borrousch

[57] ABSTRACT

Composite membranes suitable for separating gas mixtures are made by in situ crosslinking of aminoorganofunctional polysiloxane, 1 to 9 mol percent aminosiloxane units, with diisocyanate on the surface of a highly porous polymer substrate, such as polysulfone. Using the crosslinked polysiloxane as a gutter layer, a gas separating entity can be coated on the gutter layer to make a double layer composite membrane which has a higher separation factor than the crosslinked polysiloxane and can be used effectively for flat sheet membranes, as well as, hollow fiber membranes.

35 Claims, No Drawings

METHOD OF MAKING MEMBRANES FOR GAS SEPARATION AND THE COMPOSITE MEMBRANES

This application is a continuation-in-part of Ser. No. 670,519, filed Nov. 9, 1984, now abandoned.

BACKGROUND OF THE INVENTION

Field of the Invention

This invention relates to a method for making composite membranes suitable for gas separation and the composite membranes resulting from such a method.

Background Information

The idea of separating low molecular weight gases based upon differences in their rates of permeation through solid films is not new. About 150 years ago, it was observed that natural rubber is more permeable to some gases than to others. It was not, however, until the last several years that membrane processes for the separation of gases have become recognized as a viable alternative to traditional methods of cryogenic separations. The need for a simple and energy efficient commercial process has led to the current surge of interest in the use of membrane technology for gas separations.

In 1866, a theory was proposed that the permeation of gases through solid films is a three stage process consisting of the following steps:
(1) solution of the gas at one interface of the membrane,
(2) diffusion of the gas to the opposite interface, and
(3) dissolution, or release of the gas at the opposite interface.

This mechanism, known as the solution-diffusion model of permeation, is still a useful description of the permeation process and serves as the basis for most modern theories of permeability.

Considering, first, the second stage of the permeation process, diffusion, Fick's first law may be used to quantitatively describe the transport of low molecular weight gases across an isotropic, homogeneous membrane. For a flat sheet membrane, the flux, J, is given the following expression:

$$J = -D \frac{\partial c}{\partial x} \quad (1)$$

where D is the local mutual diffusion coefficient, and c is the gas concentration at a distance, x, from the membrane interface. Integration of this equation across the thickness of the membrane ($X=0$ to $X=l$) results in the following form of Fick's law:

$$J = \frac{D(c_2 - c_1)}{l} \quad (2)$$

where $c_2$ and $c_1$ are the concentrations of the permeating gas just inside the film at each interface. Equations (1) and (2) describe only the second stage of permeation, diffusion across the membrane. In addition, because it is difficult to measure the concentration of gas at a particular point within the membrane, it is necessary to relate these concentrations to some external, more easily measured variable. Henry's law states that, for dilute solutions, the concentration, c, of a dissolved gas is proportional to the partial pressure, p, of the gas in contact with the solution:

$$c = Sp \quad (3)$$

where S is the solubility coefficient (reciprocal of the Henry's law constant).

Equations (2) and (3) may be combined into an expression for the permeability of a membrane to gases:

$$J = \frac{\bar{D}\bar{S} \Delta p}{l} = \frac{\bar{P} \Delta p}{l} \quad (4)$$

where $\bar{P}$, the mean permeability coefficient is defined as the product of $\bar{D}$, the mean diffusion coefficient, and $\bar{S}$, the mean solubility coefficient, and $\Delta p$ is the difference in pressure between both sides of the membrane.

Depending on the polymer/penetrant system one is considering, $\bar{D}$ and $\bar{S}$ (and thus $\bar{P}$) may be influenced by pressure and temperature. For simple gases such as oxygen and nitrogen, however, $\bar{D}$, $\bar{S}$, and $\bar{P}$ are usually considered constant for most polymers over moderate ranges of temperature and pressure. Although permeability of a particular gas may vary over many orders of magnitude between different polymers, the permeability of a given polymer to various penetrants falls in a much narrower range. The ratio of one of these permeability coefficients to another is a useful measure of the relative rates of permeation of the gases and thus the permselectivity of the membrane. This quantity is referred to as the ideal separation factor ($a\alpha^*_{ij}$) and is defined by the expression:

$$\alpha^*_{ij} = \frac{\bar{P}_i}{\bar{P}_j} \quad (5)$$

where $\bar{P}_i$ and $\bar{P}_j$ are permeability coefficients of components i and j, the subscript i usually denoting the more permeable component.

It is an often cited generalization in selecting a material for membrane separations, that polymers displaying high selectivity for one component of a gas mixture often are of low permeability while highly permeable polymers are less discriminating between components of a mixture.

Examples of oxygen and nitrogen permeability coefficients and ideal separation factors for a number of polymers.

| Polymer | $P \times 10^{10}$ $\frac{cm^3 \cdot cm/cm^2\text{-sec-cmHg}}{}$ | | Ideal SF |
| --- | --- | --- | --- |
|  | $P_{N2}$ | $P_{O2}$ |  |
| Silicone Rubber | 281 | 605 | 2.15 |
| Poly(phenyleneoxide) | 3.81 | 15.8 | 4.15 |
| Polystyrene | 0.83 | 2.5 | 3.01 |
| Polycarbonate | 0.3 | 1.4 | 4.67 |
| Polysulfone | 0.24 | 1.3 | 5.41 |

Here it may be seen that $\bar{P}$ varies over four orders of magnitude between polymers, however, all $\alpha$'s are of the same order. Likewise it is apparent that, although considerable overlap exists, there is a correlation between low permeability and high selectivity and vice versa. One of the reasons for this observation is the influence of the physical state of the polymer on the diffusion process.

Even though a true change of state is not involved, polymers are classified as existing in either a glassy or rubbery state. Cooling a polymer from the melt results in a material that becomes first rubbery and then, as the temperature is lowered further, a hard and brittle glassy material. The temperature at which a polymer is transformed from a rubbery to a glassy material is the glass transition temperature, $T_g$. Below $T_g$ insufficient thermal energy is available for other than short range cooperative movements of chain segments. Above $T_g$ sufficient energy is available to enable relatively long segments of the polymer chain to move. In order to accommodate the movement of long chain segments, an increase in the free volume of the polymer is necessary. In addition to accommodating chain segments, this free volume may be filled by gaseous penetrants. In rubbery polymers, the free volume should be regarded as a dynamic system in which openings in the polymer matrix are continually being created and filled by chain movements. Glassy polymers, on the other hand, contain much less free volume than rubbery polymers, and openings in the matrix are relatively fixed in space. Because the total free volume is much smaller for glassy polymers, permeability tends to be low, while a narrower distribution of opening sizes enables these polymers to more readily discriminate between molecules of different sizes.

In designing a permeation process for the industrial separation of gases, the major concerns are product purity and rate of production. In selecting a membrane, therefore, one looks for a membrane displaying high intrinsic permeability for the product and low intrinsic permeability to other components of the mixture; i.e., high permeability and high permselectivity. These properties are seldom found simultaneously in one polymer. This dilemma is an important factor in the development of competitive membrane processes for the industrial separation of gases.

Fortunately, a membrane displaying high selectivity towards a component of a gas mixture need not be discarded solely on the basis of low overall permeability. Inspection of equation (4) reveals that flux may be increased by increasing the pressure difference across the membrane or by reducing the thickness of the membrane. In addition, the design of the permeator will also influence the flux as well as the practically attainable selectivity of the membrane.

In practice, the membrane separation of gases is effected by passing a feed stream of the gas mixture to be separated over the surface of a membrane, allowing only a portion of the gas to permeate and either recycling the non-permeating gas or routing it to another permeation cell. The driving force for the permeation of the gas is the pressure difference across the membrane, maintained either by hydrostatic pressure on the feed side or by vacuum on the product side of the cell or by both. Each pass of the mixture through a membrane is referred to as a stage of the separation, and the fraction permeated is referred to as the stage cut. An increase in the number of stages will result in a product of higher purity than that obtained in a single stage process. The cost of recompressing the gas at each stage, as well as the cost of additional modules, however, is often prohibitive.

The stage cut also influences selectivity as well as the rate of permeation. The greater the amount of gas that is allowed to permeate, the lower will be the degree of actual separation. Even the pattern of gas flow across the membrane surface may influence the selectivity of the process. When the stage cut is very low, however, this effect is minimized.

Because the flux described in equation (4) is the rate of permeation per unit area, another way of increasing membrane productivity is by increasing the surface area of the membrane. Simply adding modules is one way of increasing surface area; however, the permeability of polymers to gases is often so low that millions of square feet may be required for the generation of acceptable permeation rates, rendering this approach impractical.

Considerable research has been devoted to the subject of packaging of membranes into configurations offering greater membrane surface per unit volume. Two of the most successful schemes developed have been spirally wound membranes and hollow fiber membranes. Hollow fibers, in particular, offer an extremely high surface area to volume ratio. A 0.3 $m^3$ membrane device, for example, may contain as much as 500 $m^2$ surface area, compared to 20 $m^2$ for a spiral wound membrane. An additional advantage to the use of hollow fiber technology is the self supporting nature of hollow fibers, minimizing the cost of fabricating devices for their containment.

The pressure difference across the membrane has been shown to influence the flux of the membrane. The actual separation of a mixture of gases has also been shown to be dependent on the difference in pressure between the feed and product sides of the membrane. An equation for the actual separation factor, $\alpha$, in a two component separation, based on the ratio of the pressure on the high pressure (feed) side of the membrane to the pressure on the low pressure (product) side of the membrane, r, the mole fraction of the more highly permeable component of the feed, $X_A$, and the ideal separation factor ($\alpha^*$) as defined in equation (5):

$$\alpha = \frac{(\alpha^* + 1)}{2} - \frac{(1/r)(\alpha^* - 1)}{2X_A} - \frac{1}{2X_A} \pm \quad (6)$$

$$\left\{ \left( \frac{\alpha^* - 1}{2} \right)^2 + \frac{(\alpha^* - 1) - (1/r)[(\alpha^*)^2 - 1]}{2X_A} + \left[ \frac{(1/r)(\alpha^* - 1) + 1}{2X_A} \right]^2 \right\}^{\frac{1}{2}}$$

At the limit of infinite feed pressure, it is seen that the actual separation factor approaches the ideal separation factor. Along with higher operating pressures required for the maintenance of high flux and selectivity comes a requirement for membranes and equipment able to withstand such conditions as well as an increase in energy expenditure for compression of the feed mixture.

Of all the approaches to maximizing membrane flux, perhaps no other has received as much attention as reducing the thickness of the membrane itself. This approach, however, is fraught with two serious difficulties that were overcome only within the last twenty years. Gas molecules are so small that pinholes (or even microscopic imperfections in the membrane surface) are enough to render the membrane useless for gas separations. The casting of defect free ultrathin membranes by conventional casting techniques is exceedingly difficult. Irregularities in the surface upon which the membrane is cast will be incorporated in the membrane's structure which, for ultrathin membranes, may be of a magnitude in size comparable to the thickness of the membrane. These irregularities may result in pinholes through which the bulk flow of gases may occur, thus leading to a loss of permselectivity. Secondly, ultrathin membranes are extremely fragile and are often unable to withstand the pressures to which they must be subjected in membrane separation processes.

An innovative solution to this problem came about with the development of asymmetric cellulose acetate membranes. The term asymmetric refers to a membrane morphology in which a comparatively dense ultrathin skin rests on an underlying open porous structure. To cast this type of membrane, a solution of polymer in a water miscible solvent is first cast on a glass plate in the usual manner. After allowing a short time for the solvent near the surface of the membrane to evaporate and densify the polymer, the plate is immersed in water where the polymer is coagulated to form a porous matrix as water diffuses into the solution and solvent diffuses out. Because the dense layer formed in this manner represents only a small fraction of the membrane's total thickness, the fluxes of these membranes are much higher than those displayed by dense, isotropic membranes of equivalent thickness. The dense separating layer rests on a porous supporting matrix which imparts mechanical strength to the membrane.

These membranes have been extremely successful in reverse osmosis applications; however, their utility in gas separations is questionable. Although it may be considered impervious to liquids, even the dense skin contains pores that are larger than typical gas molecules. Post-treatment, such as annealing the membrane at elevated temperatures, was used to reduce pore size in the surface layer. In order for this post-treatment to be successful, however, the surface porosity must be reduced to less than $10^{-6}$ percent of the surface area. In addition, there is a tendency for these post-treatments to reduce considerably the membrane flux.

Another solution for eliminating the effects of surface porosity in asymmetric membranes is described by Henis and Tripodi in U.S. Pat. No. 4,230,463, issued Oct. 28, 1980, which is hereby incorporated by reference to show porous substrates coated with polymers in occluding contact. Their approach was to deposit a thin layer of high permeability polymer (such as silicone rubber) on the surface of a porous asymmetric membrane displaying good intrinsic selectivity for one component of the gas mixture to be separated. By sealing the surface pores in this manner, it was found that much of the selectivity of the underlying porous polymer material is retained, yet the overall permeability remains quite high. Membranes consisting of two (or more) films laminated together are referred to as composite membranes. Analagous to the flow of current in an electrical circuit, the ultimate properties of these composite membranes depend upon the respective resistances of the component parts; in this case, of the coating material, the substrate material, and the filled pores to gas flow.

The resistance (R) for a particular component of a composite membrane is given by the equation:

$$R = \frac{1}{PA} \tag{7}$$

where 1 is the thickness of the section, P is the mean permeability of the material comprising the section, and A is the surface area of the section. The total resistance of the composite membrane to the flow of a given gas, $R_T$, is calculated in the same manner as that of an equivalent electrical circuit. For the case of a composite membrane consisting of two defect-free layers laminated together, $R_T$ is simply the sum of the resistances of the individual layers. For the Henis et al. type composite membranes it may be shown that $$R_T = R_1 + \frac{R_2 R_3}{R_2 + R_3} \tag{8}$$

where the subscripts refer to the portions of the membrane. Assuming the surface area of the pores is small compared to the total surface area it may be shown that the thickness corrected permeability (P/l), is given by the following equation:

$$\frac{P}{l} = \left[ \frac{l_1}{P_1} + \frac{l_2}{P_2 + P_1(A_3/A_2)} \right]^{-1} \tag{9}$$

where $A_3$ is the surface area of the pores and $A_2$ is the total surface area of the membrane.

The ratio of the thickness corrected permeabilities for a pair of gases is equivalent to the ideal separation factor in the same manner as the ratio of the mean permeability coefficients. It is apparent that selectivity of the composite membrane may indeed approach the intrinsic selectivity of the substrate up to a comparatively high surface porosity, thus enabling one to achieve high selectivity simultaneously with high flux.

The separating entity in these composite membranes of Henis et al. is the underlying asymmetric membrane. Therefore, the choice of separating materials is limited to polymers from which asymmetric membranes may be cast. In addition, because the bulk of the material in the composite membrane is in the underlying structure, the materials of which this layer is composed should be inexpensive and easily synthesized polymers.

Fabrication of membranes in which the separating layer is deposited as an ultrathin film on the surface of a cheap porous support enables one to construct membranes employing small amounts of expensive or exotic polymers as a permselective layer. The use of such materials may be advantageous in terms of their intrinsic permselectivity. This approach actually predates the Henis et al. work and has, in general, been the most common method for developing high flux membranes for gas separations.

Several methods have been investigated for depositing an ultrathin film on the surface of a porous support. The simplest and most straightforward technique is simply to dip-coat the support film with a polymer or reactive monomer, followed by drying and/or heat curing. This method, however, has seen only limited application, mainly in the area of reverse osmosis membranes. Closely related to this technique, is the interfacial polymerization of a reactive monomer or polymer on the surface of a supporting structure. In such a method, the porous film is saturated with a water solution of a monomer or polymer and then treated with a reactive intermediate dissolved in a solvent that is immiscible with water. Because the reaction between the monomer or polymer takes place only at the interface, the separating layer that results is exceedingly thin. Thus far, this method has been applied commercially only to making membranes for reverse osmosis separations.

Gas phase deposition of polymers on porous supports is a promising new technique that has been investigated; but, as yet, there are no commercial applications of this process.

An alternative to directly depositing the film on a supporting layer is to separately cast the film and afterwards laminate the ultrathin separating layer to the porous support. Perhaps the easiest method of accomplishing this is to dip a glass plate into a dilute solution of the polymer, withdraw the plate and allow the solvent to evaporate. The film that remains may then be freed from the glass surface by immersing the plate in water. Finally, one or more of these films are carefully laminated on the surface of a porous support. A second method is to cast a solution of polymer in a hydrophobic solvent on a water surface, allowing the solution to spread and form an ultrathin film. After allowing the solvent to evaporate, the film is picked up and deposited on the supporting layer. These techniques have proven useful for casting membranes as thin as 150 angstroms that are essentially defect free.

The membranes described above were laminated singly or in a number of layers onto porous supports for use in gas separations. The thickness of the separating layers although advantageous in terms of increasing membrane flux, complicates membrane fabrication procedures due to the susceptibility of these layers to damage during lamination. Composite membranes consisting of ultrathin glassy polymer films on porous glassy polymer supports are especially prone to damage during handling. Browall and Salemme, in U.S. Pat. No. 3,874,986, issued Apr. 1, 1975, and Browall in U.S. Pat. No. 3,980,456, issued Sept. 14, 1976, solves this problem by incorporating an intermediate layer of organopolysiloxane-polycarbonate copolymer between a microporous layer and a non-porous layer where the intermediate layer serves as a cushion and adhesive.

Another disadvantage to the separate casting of the supporting structure and permselective layer is the limitation of the technique to the coating of flat sheet membranes. The advantages of the hollow fiber form to flat sheet membranes has been described above.

In Japanese Patent Publication No. Sho 57[1982]-105,203, published June 30, 1982, to Toray K.K., Hirose and Kurihara describe selectively permeable membranes produced by crosslinking an amino polysiloxane consisting mainly of the repeating units of the generic formulae

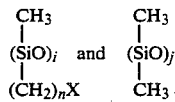

where X is —NH$_2$ or an amino radical with 1 to 4 primary or secondary amino groups and being aliphatic or alicyclic, n is an integer of 1 to 10, and i and j expressed as mole fractions satisfy the conditions: i+j=1.0, $0.1 \leq i \leq 1$; and $0 \leq j \leq 0.9$.

Hirose and Kurihara describe crosslinking the aminopolysiloxane with crosslinking agents such as acid chlorides, acid anhydrides, isocyanate, thiocyanate, sulfonyl chloride, epoxides, or compounds containing two or more functional groups such as active halogens in each molecule. When the crosslinking agent is soluble in water or alcohol, a solution of the aminopolysiloxane and the crosslinking agent are mixed and coated on the porous support. When the crosslinking agent is insoluble in water or alcohol or when it reacts with these solvents, the membrane is formed by surface polycondensation. The aminopolysiloxane is first coated on the porous support and the polymer solution is allowed to penetrate into holes for a specified time, preferably several seconds to 30 minutes. The surface of the support can be dried by hot air. Then, the surface of the support covered with an aminopolysiloxane film is brought into contact with a solution of a multifunctional crosslinking agent capable of reacting with the amino groups in the aminopolysiloxane. The preferred solvent for the multifunctional crosslinking agent is usually a hydrocarbon solvent such as petroleum ether, hexane, or heptane. The appropriate concentration of crosslinking agent in this solution will differ according to the reaction substrate, crosslinking agent, and solvent, about 0.1 to 2 weight percent gives good results. To complete the crosslinking reaction, heating is usually necessary, generally 1 to 30 minutes at 50° to 180° C.

SUMMARY OF THE INVENTION

This invention relates to a method for making a composite suitable for increasing the oxygen gas content of an oxygen-nitrogen gas mixture by passing the mixture through the composite, consisting essentially of coating an aminoorganofunctional polysiloxane on at least one surface of a 20 to 250 μm thick, highly porous, polymer substrate, where the polysiloxane is applied in a thickness sufficient to provide a cured membrane having a thickness of 0.1 μm to 20 μm, the polysiloxane consisting essentially of a random copolymer having from 1 to 9 mol percent aminosiloxane units having primary aminoorganofunctionality and 91 to 99 mol percent other repeating siloxane units, contacting the polysiloxane coated on the substrate with a solution of a non-isocyanate-reactive organic solvent and diisocyanate for a sufficient time to cause a crosslinked membrane to form, where the weight ratio of the polysiloxane to the diisocyanate is in an inverse relationship to the permeability coefficient of the composite.

One objective of this invention is to provide a method for making a membrane for the oxygen enrichment of air. The characteristics sought in this membrane were good permselectivity for oxygen (3 to 4 ideal separation factor), reasonably high flux, and adaptability to hollow fiber technology. A composite membrane prepared by directly depositing the component layers on the supporting surface best suited the requirements of the membrane.

A second objective of this invention is to provide an improved intermediate layer in the membranes. In particular, this layer serves to cushion the separating layer, and also serves a "gutter layer" channeling permeated gas into the surface pores of the polysulfone (PSF) support, thus enhancing the flux of the composite membrane by increasing the effective surface area of the separating film.

DETAILED DESCRIPTION OF THE INVENTION

The method for making the composites of this invention is similar to the methods used by Hirose and Kurihara in Japanese Patent Publication No. Sho 57 [1982]-105,203. The present method allows the use of low aminosiloxane unit content in the aminoorganofunctional polysiloxane; i.e., 1 to 9 mol percent aminosiloxane units. These aminoorganofunctional polysiloxanes can be crosslinked with diisocyanates on porous substrates to make useful composites for gas separation, especially for oxygen enrichment of gas mixtures, such as air.

Hirose and Kurihara teach that unless the polysiloxane has 10 mol percent or more of aminosiloxane units, the polysiloxane cannot be satisfactorily crosslinked. The present method not only uses less than 10 mol percent aminosiloxane units in the polysiloxane, but finds that the permeability coefficient of the resulting composite can be controlled by the weight ratio of the polysiloxane to the diisocyanate used to crosslink the polysiloxane. Increasing the ratio will result in a decrease in the permeability coefficient of gases such as oxygen and nitrogen for the composite. The change in the permeability coefficient does not cause a substantial change in the separation factor (SF, $\alpha$).

The support layer can be a sheet or hollow fiber, for example, and made from highly porous polymers, such as polysulfones (PSF), polystyrene, and others as defined in U.S. Pat. No. 4,230,463 which is hereby incorporated by reference to show materials from which porous substrates can be made. Such porous substrates are well-known in the art and many are made commercially. Preferably, the porous substrate is PSF.

The porous substrate is preferably 20 to 250 $\mu$m thick and the pore diameters are preferably in the range of 0.01 to 0.1 $\mu$m. At least one surface of the porous substrate is coated with an aminoorganofunctional polysiloxane. Preferably, the denser surface is coated and is also the surface contacting the feed gas. The polysiloxane is preferably in an organic solvent solution when coated on the porous substrate. The organic solvent used in making the polysiloxane solution is substantially a non-solvent for the porous substrate material and is non-reactive with the porous substrate and the polysiloxane, such as hexane, see U.S. Pat. No. 4,230,463, for further information regarding the solvents suitable to dissolve the polysiloxane and not effect the porous substrate.

The polysiloxane is coated on the surface of the porous substrate in an amount sufficient to provide a cured coating thickness of 0.1 $\mu$m to 20 $\mu$m. The concentration of the polysiloxane in the organic solvent is preferably in the range of 1 to 20 weight percent, but can vary outside this range depending upon the nature of the solvent and the polysiloxane. The most practical concentration of polysiloxane in solvent is 1 to 10 weight percent. For sheet materials, the polysiloxane solution can be flooded over the porous substrate surface so that an even coating is applied to the surface. Other methods of applying an even coat will be suggested by the construction of the porous substrate. For example, hollow fiber surfaces (tubes) can be coated by passing the solution through the tube. One or more passes can be used to build a coating thickness to provide a defined system for gas separation. After the solution of polysiloxane is applied to the porous substrate surface, the solvent is evaporated; and the polysiloxane forms a film of uncrosslinked polysiloxane. The polysiloxane film is then crosslinked to an elastomeric film by diisocyanate. The diisocyanate is applied to the polysiloxane film from organic solvent. The concentration of the diisocyanate in the organic solvent can be varied and should be sufficient to crosslink the polysiloxane. Preferably, the concentration of diisocyanate is from 0.1 to 5 weight percent, most preferably from 0.2 to 4 weight percent. After the diisocyanate is spread over the polysiloxane film, the diisocyanate is allowed to remain in contact with polysiloxane to provide the amount in the polysiloxane to crosslink. Usually, a time of 5 to 30 seconds is sufficient. The excess diisocyanate solution is removed from the polysiloxane film surface, whether poured off, drained from the hollow fibers, and the like. After the excess diisocyanate solution is drained off, the treated polysiloxane film surface is dried at room temperature, and can then be further cured by heating at a temperature of 50° to 150° C. for 1 to 30 minutes.

The aminoorganofunctional polysiloxane is one which has from 1 to 9 mol percent aminosiloxane units and is a random copolymer. The aminosiloxane units are those having primary amine groups, such as

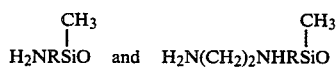

where R is a divalent radical selected from

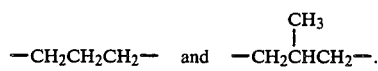

The polysiloxane also has 91 to 99 mol percent of other repeating siloxane units, such as dimethylsiloxane units, phenylmethylsiloxane units, and diphenylsiloxane units. The polysiloxane can be terminated with trimethylsiloxy units, dimethylphenylsiloxy units, and aminosiloxane units, such as

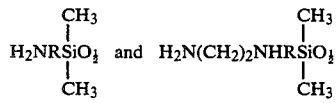

The polysiloxane preferably contains an average of up to about 15,000 siloxane units per molecule. Preferred aminoorganofunctional polysiloxanes are random terpolymers of two trimethylsiloxy units, 2 to 15,000 dimethylsiloxane units, and 2 to 160 aminosiloxane units selected from units of the general formulae

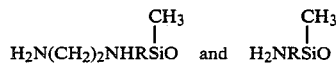

in which R is a divalent radical selected from

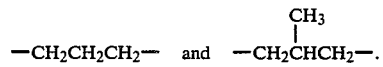

The preferred embodiments of composite membranes contain aminoorganofunctional polysiloxane which have an average of from 100 to 800 siloxane units per molecule. Some preferred random polysiloxanes have the following average formulae

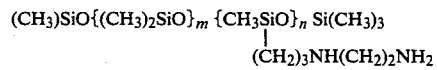

where m and n have values such that there is about 2 mol % aminosiloxane units of the formula

and the average total number of siloxane units per molecule is about 100; and

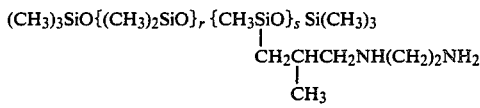

where r and s have values such that there is about 8 mol % aminosiloxane units of the formula

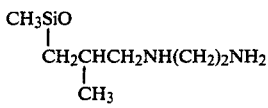

and the average total number of siloxane units per molecule is about 300; and also a polysiloxane where r and s have values such that there is about 2 mol % aminosiloxane units of the formula

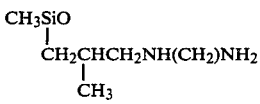

and the average total number of siloxane units per molecule is about 100.

The diisocyanate can be aromatic, aliphatic, or alicyclic, such as toluene diisocyanate, diphenylmethane diisocyanate, naphthalene diisocyanate, benzene diisocyanate, hexamethylene diisocyanate, cyclohexane diisocyanate, and meta-xylylene diisocyanate. The preferred diisocyanate is toluene diisocyanate (TDI).

A composite made as described above can have an SF of 2.4 to 2.9 with permeability coefficients for oxygen of $18 \times 10^{-10}$ to $180 \times 10^{-10}$ cm$^3$ cm sec$^{-1}$ cm$^{-2}$(cmHg)$^{-1}$ and for nitrogen of $6 \times 10^{-10}$ to $75 \times 10^{-10}$ cm$^3$ cm sec$^{-1}$ cm$^{-2}$(cmHg)$^{-1}$.

Although the above composite of porous substrate coated with a film of crosslinked aminoorganofunctional polysiloxane is useful for separating gases, such as increasing the oxygen content in an oxygen-nitrogen mixture, a composite made by putting an ultrathin layer of a poly(2,6-dimethyl-1,4-phenyleneoxide) (PPO) over the crosslinked aminoorganofunctional polysiloxane film provides a composite with more advantages and broader utility. The SF can be made higher, the crosslinked polysiloxane can act as a gutter layer, and the surface does not readily pick up contaminants, such as dust particles.

The PPO can be a brominated-PPO having up to 60 percent or more of the repeating units containing —CH$_2$Br, such as from 1 to 60 percent. The preferred brominated-PPO can have molecular weights from 20,000 to 5000,000 and repeating units selected from

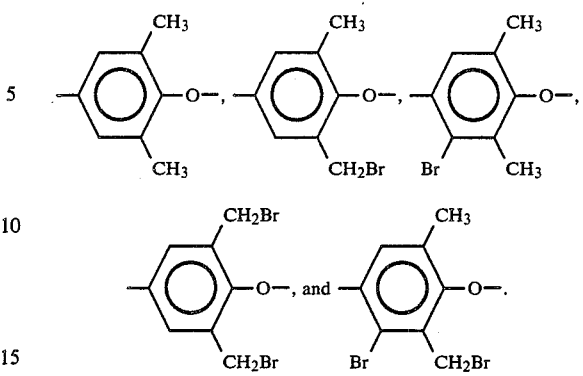

The brominated-PPO can be used as the separating layer which exhibits high SF. SF values of greater than 8 for oxygen-nitrogen mixtures can be obtained. Other poly(phenyleneoxides) are also expected to be useful for the separating layer in the double layer composite membranes.

An ultrathin PPO film is deposited over the crosslinked polysiloxane film, as the separating entity. The PPO layer can be deposited in a thickness of 2 μm, but is usually deposited from an organic solvent in a thickness of 0.5 μm or less. The combined thickness of the gutter layer and the PPO layer can be as thin as 1 μm. The membrane performance, i.e. the composite, depends upon the relationship between the thicknesses of the sublayers, the porosity of the substrate, and the fraction of imperfections in the separating layers. Minor damage to the separating layer will not cause a total collapse of the membrane performance, and severe damage to the separating layer, such as greater than 2% surface defects, will reduce the separation ability of the membrane to that of the gutter layer (intermediate crosslinked polysiloxane layer). The crosslinked polysiloxane layer has an increased separation factor and an increased inertness. Also, if the top layer, separating layer, is damaged, it can be recoated and the membrane's initial performance can be restored, even in a module.

In an embodiment of the present invention, a particularly useful separating membrane was a double layer composite membrane made from a supporting matrix of porous polysulfone (PSF) casting sheet upon which was deposited ultrathin layers of an aminoorganofunctional polysiloxane crosslinked in situ by TDI and an ultrathin layer of PPO which provided the enrichment of air by applying one path through this membrane thus yielding 40 to 50 percent oxygen in the gas mixture.

The following examples are presented for illustrative purposes and should not be construed as limiting the invention which is properly delineated in the claims.

EXAMPLE 1

Composite membranes were prepared by evenly spreading a solution of aminoorganofunctional polysiloxane in hexane (the concentration and kind of polysiloxane used was as shown in Table I) across one surface of a rectangular casting sheet of porous anisotropic polysulfone (ca. 7×14 cm) secured in a frame devised for this purpose. A small quantity (sufficient to provide the desired film thickness) of solution was poured into one end of the frame which was then tilted so as to allow the solution to flow evenly across the surface.

The excess solution was removed after 15 minutes on the surface, and the film adhering to the surface of the polysulfone was allowed to dry for 2 minutes. After allowing the solvent to evaporate, a solution of 2 weight percent toluene-2,4-diisocyanate (referred to hereinafter as TDI) in hexane was spread across the surface in a similar manner to the polysiloxane solution. The solutions were allowed to reside on the surface of the polysulfone for 15 seconds and then unreacted solution was drained from the surface. The TDI formed a crosslinked polysiloxane coating which was allowed to dry at room temperature for about five minutes and was then cured in a convection oven for 10 to 12 minutes at a temperature of 90° to 95° C. to form the crosslinked polysiloxane-polysulfone composite membrane. The thickness of each of these composite membranes was measured by scanning election microscopy (SEM), and also determined and measured for each composite membrane was the ideal separation factor, the actual separation factor, and the permeability coefficients for nitrogen gas and oxygen gas.

Double layer composite membranes were prepared by coating the crosslinked polysiloxane-polysulfone composite membranes with poly(2,6-dimethyl-1,4-phenyleneoxide) (referred to as PPO). PPO was coated on the surface of crosslinked polysiloxane-polysulfone composite, that had been cut to fit permeation cells, by a slightly different method than used to apply the polysiloxane. This variation in coating technique was necessary in order to evaluate the same membrane before and after the application of PPO. PPO was applied to the crosslinked polysiloxane surface of these composite membranes by fastening the membrane to the outside of a cylinder having a diameter of about 10 cm. The cylinder was held above the surface of a small dish filled to almost overflowing, such that the meniscus of the solution was above the dish rim, with a one weight percent solution of PPO in $CCl_4$. The cylinder was next lowered so as to bring the solution in contact with the membrane. Finally, the cylinder was rotated so that the entire surface of the membrane contacted the solution; the membrane was removed from the solution, allowed to dry and form the double layer composite membrane.

The PPO film thickness was measured by scanning electron microscopy; and the ideal SF, the actual SF, and the permeability coefficients for nitrogen gas and oxygen gas were determined and measured. The results were as shown in Table II. Also shown in Table II are predicted values for comparison with the observed valves.

The polysulfone casting sheets were manufactured by U.O.P., Inc., of San Diego, California, were designated E-183 and were pre-cast microporous polysulfone membrane laminated to a paper backing (air permeability = $95 \times 10^{-5}$ g cm$^{-2}$ sec$^{-1}$ atm$^{-1}$).

The aminoorganofunctional polysiloxane used here had a general formula

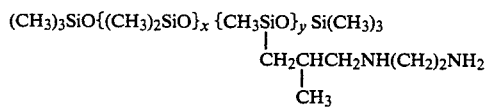

where x had an average value of about 276 and y had an average value of about 24 which is about 8 mol percent aminosiloxane units.

Ideal Separation Factor

The ideal separation factor for these composite membranes in oxygen/nitrogen separations was determined from the ratio of their permeability coefficients for the two gases. Membranes were placed in permeation cells and their permeability to pure oxygen or nitrogen was determined. For permeability testing pure gas is fed to the cell through an inlet, an outlet is used as a fine adjustment of the pressure, and the permeant is routed to a soap bubble flow meter. The flow rate was measured at a given pressure by determining the time required for a bubble to displace a given volume in the flow meter. The flow rate divided by the surface area of the membrane exposed to the gas is equivalent to the flux. The flux, pressure difference, and thickness of the membrane (determined by SEM) were used to calculate the permeability coefficient. For a single membrane, however, one needed only to determine the fluxes of the two gases at a given pressure to calculate the ideal separation factor because all other parameters were identical.

Actual Separation Factor

The actual separation factor for membranes in oxygen/nitrogen separations was determined using essentially the same apparatus. Actual separation factors were determined for membranes exposed to air under pressure, and for conditions of reduced pressure on the product side of the membrane. In both methods, air was fed to the cell with the outlet port opened all the way in order to maintain a low stage cut. The permeant was routed through the sample loop of a gas chromatograph (F&M model 720); non-permeated feed to the other.

Composition of the feed and product were determined from the areas of the peaks on gas chromatograms. Areas were calculated by multiplying the peak height times the width at half the height. Oxygen and nitrogen compositions were given by the following relations:

$$\% \ O_2 = \frac{A_{O2}}{A_{O2} + A_{N2}}$$

$$\% \ N_2 = \frac{A_{N2}}{A_{O2} + A_{N2}}$$

where $A_{O2}$ and $A_{N2}$ were the areas of the oxygen and nitrogen peaks respectively. The following equation was used to calculate the actual separation factor:

$$\alpha = \frac{\frac{X_{O2}}{X_{N2}}}{\frac{Y_{O2}}{Y_{N2}}}$$

where $X_{O2}$ and $X_{N2}$ were the percent oxygen and nitrogen in the product and $Y_{O2}$ and $Y_{N2}$ were the percent oxygen and nitrogen in the feed.

The actual separation factor was determined with the product side of the membrane at ambient pressure (approx. 1 atm.) and a feed pressure of from 10 psig to 100 psig. Alternatively, the feed stream was held at constant pressure (typically 20 psig) and the product side evacuated to 0.1 to 1 psig absolute pressure. Three samples were injected into the G.C. for analysis at each pressure reading.

Scanning Electron Microscopy

Thicknesses of coatings as well as other aspects of membrane morphology were determined by Scanning Electron Microscopy. Samples were cut from membranes after they were evaluated by the methods described above. These samples were fractured under liquid nitrogen and mounted edgewise on sample stubs with Neolube dry film lubricant. Two samples approximately 1×0.5 cm were mounted on each stub. The samples were coated with a gold/palladium film on a Hummer II using two pulses of 100 mA for 90 seconds each. The samples were examined with an ETEC SEM under a 20 kV beam. Photographs were made with Polaroid Type 55 positive/negative film. Comparison of layer thickness in photos to the micron bar superimposed on the photo was used to calculate the thickness.

Composite membranes consisting of a single coating of crosslinked polysiloxane on polysulfone were prepared and evaluated as described above. The first test to which each of these membranes was subjected was the determination of their ideal separation factor from flux measurements of oxygen and nitrogen. Fluxes were measured first at 20 psig feed pressure to provide an indication as to their potential. Membranes exhibiting ideal separation factors greater than or equal to that of silicone rubber (approx. 2) were subjected to further testing.

Membranes in which there are no defects should display a linear relationship between flux and pressure difference across the membrane. Linearity was observed for all membranes, demonstrating the absence of any substantial defects.

composite membranes with varying thicknesses of crosslinked polysiloxane. After cross-linking the polysiloxane with TDI, these composite membranes were tested for permeability to pure oxygen and pure nitrogen over a range of pressures from 10 to 50 psi. These same membranes were then coated by dipping the surface into one weight percent solutions of PPO as described above. They were then exposed to the same tests as the singly coated membranes.

Although the correlation is far from perfect, there does appear to be a trend towards thicker membranes with higher concentrations of coating solutions. Permeability coefficients for the singly coated membranes appear to fall over a wide range of values.

TABLE I

| Composite Membrane Designation | Concentration of Polysiloxane, wt % of Solution | Surface Layer Thickness, μm | Permeability[1] (P) Oxygen | Permeability[1] (P) Nitrogen | Actual Separation Factor[2] (α) |
|---|---|---|---|---|---|
| A | 8 | 6.7 | 181 | 73.2 | 2.47 |
| B | 4[4] | 2.8 | 115 | 45.4 | 2.53 |
| C | 4[5] | 2.22 | 122 | 50.1 | 2.44 |
| D | 4 | 0.98 | 42.7 | 16.8 | 2.54 |
| E | 2 | 0.27 | 27.8 | 11.6 | 2.40 |
| F[3] | 2[6] | 0.44 | 18.1 | 6.34 | 2.85 |

[1] Permeability × $10^{10}$ cm$^3$cm sec$^{-1}$ cm$^{-2}$ (cm Hg)$^{-1}$
[2] $= \frac{P(O_2)}{P(N_2)}$
[3] The TDI had a 20 second resident time on the polysiloxane.
[4] Three applications of the 4 wt % polysiloxane solution, air dried between applications.
[5] Two applications of the 4 wt % polysiloxane solution, air dried between applications.
[6] Two applications of the 2 wt % polysiloxane solution, air dried between applications.

TABLE II

| Double Layer Composite Membrane Designation | Thickness, μm Polysiloxane Layer | Thickness, μm PPO Layer | Gas | Permeability Polysulfone Coated W/Silicone and PPO Predicted[2] | Permeability Polysulfone Coated W/Silicone and PPO Observed | Separation Factor (α) Predicted | Separation Factor (α) Observed |
|---|---|---|---|---|---|---|---|
| A' | 6.7 | 0.95 | O$_2$ | 79.0 | 91.9 | 3.51 | 3.50 |
|  |  |  | N$_2$ | 22.5 | 26.3 |  |  |
| B' | 2.8 | 1.26 | O$_2$ | 39.2 | 53.8 | 3.77 | 4.08 |
|  |  |  | N$_2$ | 10.4 | 13.2 |  |  |
| C' | 2.2 | 1.64 | O$_2$ | 31.7 | 61.7 | 3.90 | 3.73 |
|  |  |  | N$_2$ | 8.14 | 16.6 |  |  |
| D' | 0.98 | 1.53 | O$_2$ | 21.04 | 32.0 | 3.85 | 3.51 |
|  |  |  | N$_2$ | 5.47 | 9.12 |  |  |
| E' | 0.27 | 0.69 | O$_2$ | 18.0 | 32.4 | 3.83 | 4.31 |
|  |  |  | N$_2$ | 4.71 | 7.51 |  |  |
| F' | 0.44 | 0.88 | O$_2$ | 16.5 | 23.4 | 3.75 | 4.21 |
|  |  |  | N$_2$ | 4.41 | 5.57 |  |  |

[1] Permeability × $10^{10}$ cm$^3$cm sec$^{-1}$cm$^{-2}$ (cm Hg)$^{-1}$

[2] Predicted from resistance model: $\frac{l_m}{P_m} = \frac{l_1}{P_1} + \frac{l_2}{P_2}$ where $P_m$ = permeability of composite membrane; $l_m$ = total thickness (polysiloxane + PPO); $l_1$ = thickness of polysiloxane; $l_2$ = thickness of PPO; $P_1$ = permeability of polysulfone coated w/polysiloxane; $P_2$ = permeability of PPO.

For coating a thin film of PPO on the surface of a crosslinked polysiloxane polysulfone composite membrane, deposition from solution was thought to be the most desirable from the standpoint of applicability to the coating of hollow fiber membranes.

Actual separation factor for composite membranes containing a surface layer of PPO likewise were greater than for membranes coated only with crosslinked polysiloxane.

In order to investigate the effect of the intermediate layer on the permeation behavior of these membranes, a series of membranes was prepared by coating polysulfone supports with different concentrations of the aminoorganofunctional polysiloxane in order to achieve

EXAMPLE 2

The effect of the aminoorganofunctional polysiloxane/TDI weight ratio on the permeability and selectivity of PSF-polysiloxane composite membranes was determined.

Three composite membranes were prepared as described in Example 1 except as further described here. A surface of the PSF casting sheet was coated with a hexane solution of polysiloxane as described in Example 1 leaving the polysiloxane on the PSF surface for 20 seconds and then air drying for 2 minutes. A solution of 2 weight percent TDI in hexane was applied to the polysiloxane surface, allowing the TDI to contact the surface for 20 seconds, removing any unreacted solution, air drying, and then heating in a convection oven at 90° C. for 10 minutes. The concentration of the polysiloxane for each experiment is described in Table III. The oxygen and nitrogen permeability and the actual SF were determined as shown in Table III.

TABLE III

| Concentration of Polysiloxane, wt % | Weight Ratio of Polysiloxane to TDI | $P_{O2}$ | $P_{N2}$ | α |
|---|---|---|---|---|
| 2 | 1:1 | 22 | 8 | 2.75 |
| 4 | 2:1 | 94 | 38 | 2.47 |
| 8 | 4:1 | 181 | 73.2 | 2.47 |

EXAMPLE 3

A PSF casting sheet coated with crosslinked polysiloxane prepared as described in Example 1, Composite Membrane C was coated with a CCl$_4$ solution containing one weight percent of a brominated-PPO having a general formula

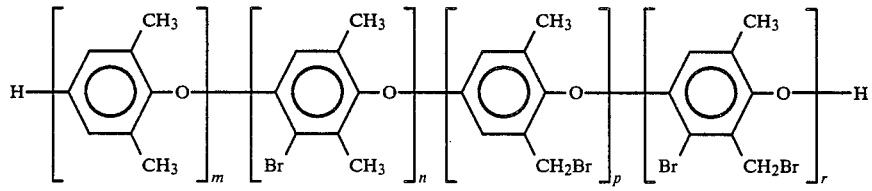

in which the sum of m, n, p, and r is such that the molecular weight is about 80,000 and 45 percent of the units contain —CH$_2$Br. The coating procedure was the same as described in Example 2. The resulting membrane had an actual separation factor of $\alpha O_2/N_2 = 8.2$ corresponding to a permeation rate of $8 \times 10^{10}$ cm$^3$ cm sec$^{-1}$ cm$^{-2}$ (cmHg)$^{-1}$ for oxygen gas.

That which is claimed is:

1. A method for making a composite suitable for increasing the oxygen gas content of an oxygen-nitrogen gas mixture by passing the mixture through the composite, consisting essentially of
    coating an aminoorganofunctional polysiloxane on at least one surface of a 20 to 250 μm thick, highly porous, polymer substrate, where the polysiloxane is applied in a thickness sufficient to provide a cured membrane having a thickness of 0.1 μm to 20 μm, the polysiloxane consisting essentially of a random copolymer of from 1 to 9 mol percent aminosiloxane units having primary aminoorganofunctionality and 91 to 99 mol percent other repeating siloxane units
    contacting the polysiloxane coated on the substrate with a solution of a non-isocyanate-reactive organic solvent and diisocyanate for a sufficient time to cause a crosslinked membrane to form, where the weight ratio of the polysiloxane to the diisocyanate is in an inverse relationship to the permeability coefficient of the composite.

2. The method in accordance with claim 1 in which the polysiloxane has up to 15,000 siloxane units.

3. The method in accordance with claim 2 in which the aminosiloxane units of the polysiloxane are selected from units of the general formulae

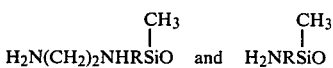

in which R is a divalent radical selected from

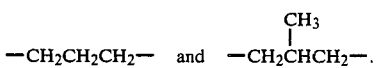

4. The method in accordance with claim 3 in which the polysiloxane is a random terpolymer of two trimethylsiloxy units, 2 to about 15,000 dimethylsiloxane units, and 2 to 160 of the aminosiloxane units.

5. The method in accordance with claim 4 in which the average total number of siloxane units in the polysiloxane is in the range of from 100 to 800 per molecule.

6. The method in accordance with claim 1 in which the diisocyanate is toluene-2,4-diisocyanate.

7. The method in accordance with claim 2 in which the diisocyanate is toluene-2,4-diisocyanate.

8. The method in accordance with claim 3 in which the diisocyanate is toluene-2,4-diisocyanate.

9. The method in accordance with claim 4 in which the diisocyanate is toluene-2,4-diisocyanate.

10. The method in accordance with claim 5 in which the diisocyanate is toluene-2,4-diisocyanate.

11. A composite membrane obtained from the method of claim 1.

12. A composite membrane obtained from the method of claim 5.

13. A composite membrane obtained from the method of claim 6.

14. A composite membrane obtained from the method of claim 10.

15. A method in accordance with claim 1 in which the product obtained is further processed by contacting the crosslinked membrane with poly(2,6-dimethyl-1,4-phenyleneoxide) in an amount sufficient to provide an ultrathin layer which is effective as a gas selective film.

16. The method in accordance with claim 15 in which the poly(2,6-dimethyl-1,4-phenyleneoxide) is in an organic solvent when contacting the crosslinked polysiloxane.

17. The method in accordance with claim 16 in which the concentration of the poly(2,6-dimethyl-1,4-phenyleneoxide) in organic solvent is 0.1 to 5 weight percent.

18. The method in accordance with claim 17 in which the organic solvent is carbon tetrachloride.

19. A method in accordance with claim 1 in which the product obtained is further processed by contacting the crosslinked membrane with a brominated poly(2,6-dimethyl-1,4-phenyleneoxide) in an amount sufficient to provide an ultrathin layer which is effective as a gas selective film.

20. The method in accordance with claim 19 in which the brominated poly(2,6-dimethyl-1,4-phenyleneoxide) consists essentially of a mixture of the following repeating units

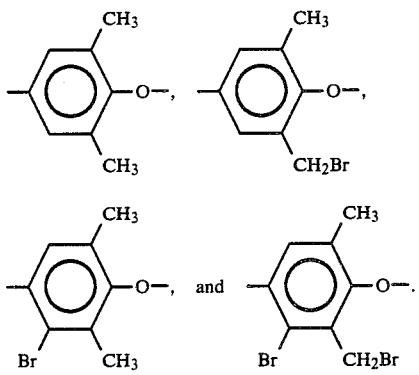

21. The method in accordance with claim 20 in which the brominated poly(2,6-dimethyl-1,4-phenylenoxide) is in an organic solvent when contacting the crosslinked polysiloxane.

22. The method in accordance with claim 21 in which the concentration of the poly(2,6-dimethyl-1,4-phenyleneoxide) in organic solvent is 0.1 to 5 weight percent.

23. The method in accordance with claim 22 in which the organic solvent is carbon tetrachloride.

24. A double layer composite membrane suitable for separating gases consisting essentially of a 20 to 250 μm thick highly porous polymer substrate having tightly adhered thereto a gutter layer of a highly gas permeable rubber obtained by crosslinking an aminoorganofunctional polysiloxane having from 1 to 9 mol percent primary aminoorganofunctionality bearing siloxane units and 91 to 99 mol percent other siloxane units, and tightly adhered and overcoating the gutter layer is a gas separating entity.

25. The composite membrane according to claim 24 in which the aminoorganofunctional polysiloxane crosslinked is derived from a random terpolymer polysiloxane having two trimethylsiloxy units, 2 to 15,000 dimethylsiloxane units, and 2 to 160 units selected from the general formulae

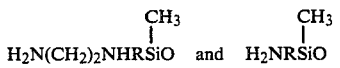

in which R is a divalent radical selected from

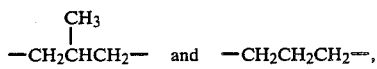

the polysiloxane is crosslinked with diisocyanate and the gutter layer is 0.1 to 20 μm thick, the gas separating entity is poly(2,6-dimethyl-1,4-phenyleneoxide) and is less than 2 82 m thick.

26. The composite membrane according to claim 24 in which the aminoorganofunctional polysiloxane crosslinked is derived from a random terpolymer polysiloxane having two trimethylsiloxy units, 2 to 15,000 dimethylsiloxane units, and 2 to 160 units selected from the general formulae

in which R is a divalent radical selected from

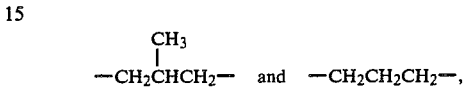

the polysiloxane is crosslinked with diisocyanate and the gutter layer is 0.1 to 20 μm thick, the gas separating entity is brominated-poly(2,6-dimethyl-1,4-phenyleneoxide) having an average molecular weight in the range of from 40,000 to 130,000 and a mixture of repeating units of

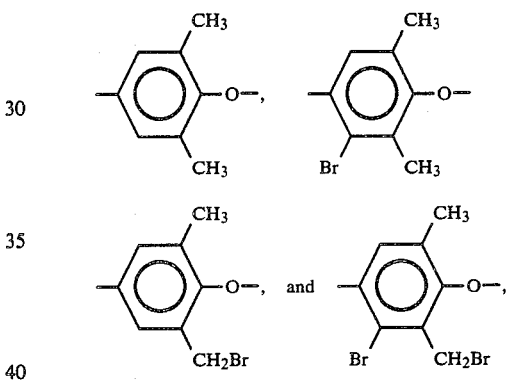

and is less than 2 μm thick.

27. A composite membrane made by the method of claim 15.

28. A composite membrane made by the method of claim 16.

29. A composite membrane made by the method of claim 17.

30. A composite membrane made by the method of claim 18.

31. A composite membrane made by the method of claim 19.

32. A composite membrane made by the method of claim 20.

33. A composite membrane made by the method of claim 21.

34. A composite membrane made by the method of claim 22.

35. A composite membrane made by the method of claim 23.

* * * * *

UNITED STATES PATENT AND TRADEMARK OFFICE
CERTIFICATE OF CORRECTION

PATENT NO. : 4,602,922
DATED : July 29, 1986
INVENTOR(S) : Cabasso et al

It is certified that error appears in the above-identified patent and that said Letters Patent is hereby corrected as shown below:

Col. 11, Line 68: "20,000 to 5000,000" should read "20,000 to 500,000"

Col. 20, Line 2: "is less than 2 82 m thick" should read "is less than 2 $\mu$m thick"

Signed and Sealed this

Eleventh Day of August, 1987

Attest:

DONALD J. QUIGG

Attesting Officer

Commissioner of Patents and Trademarks